No. 691,328. Patented Jan. 14, 1902.
I. D. SMEAD.
COMBINED CREMATORY AND HEATING SYSTEM.
(Application filed Feb. 21, 1901.)
(No Model.) 6 Sheets—Sheet 1.

Witnesses:

Inventor:
Isaac D. Smead,
by Dodge and Sons,
Attorneys.

No. 691,328. Patented Jan. 14, 1902.
I. D. SMEAD.
COMBINED CREMATORY AND HEATING SYSTEM.
(Application filed Feb. 21, 1901.)

(No Model.) 6 Sheets—Sheet 2.

No. 691,328. Patented Jan. 14, 1902.
I. D. SMEAD.
COMBINED CREMATORY AND HEATING SYSTEM.
(Application filed Feb. 21, 1901.)
(No Model.) 6 Sheets—Sheet 3.

Witnesses:

Inventor:
Isaac D. Smead,
by Dodge and Sons,
Attorneys.

No. 691,328. Patented Jan. 14, 1902.
I. D. SMEAD.
COMBINED CREMATORY AND HEATING SYSTEM.
(Application filed Feb. 21, 1901.)
(No Model.) 6 Sheets—Sheet 4.

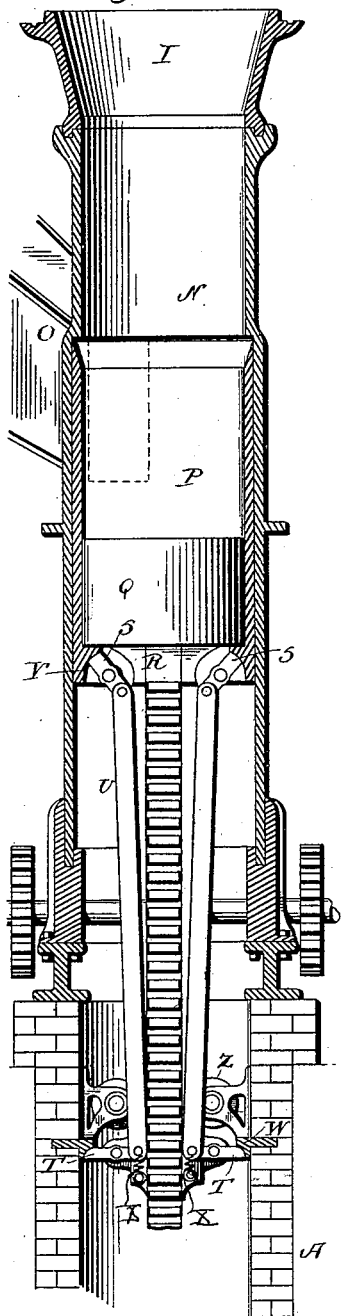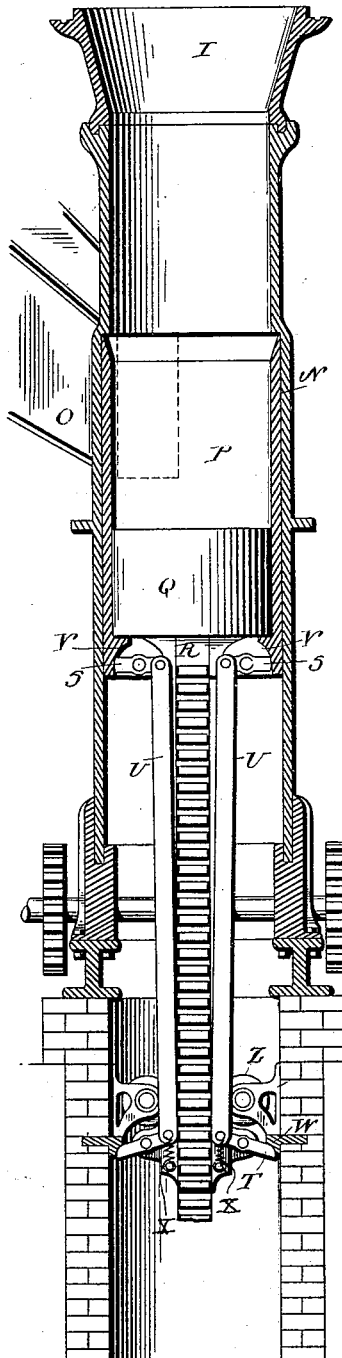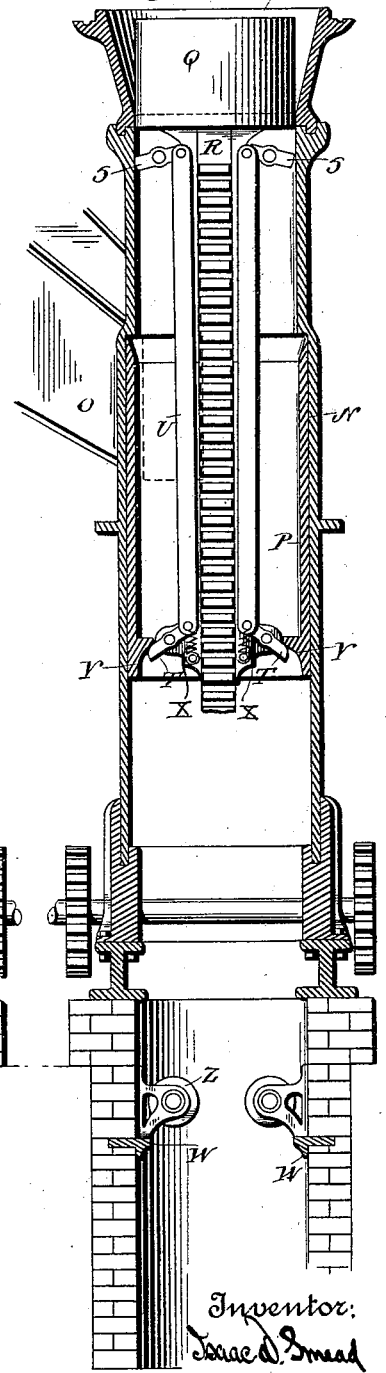

UNITED STATES PATENT OFFICE.

ISAAC D. SMEAD, OF CINCINNATI, OHIO.

COMBINED CREMATORY AND HEATING SYSTEM.

SPECIFICATION forming part of Letters Patent No. 691,328, dated January 14, 1902.

Application filed February 21, 1901. Serial No. 48,284. (No model.)

*To all whom it may concern:*

Be it known that I, ISAAC D. SMEAD, a citizen of the United States, residing at Cincinnati, in the county of Hamilton and State of Ohio, have invented certain new and useful Improvements in a Combined Crematory and Heating System, of which the following is a specification.

My present invention pertains to a central plant for heating water and consuming garbage, refuse material, and the like.

Figure 1:
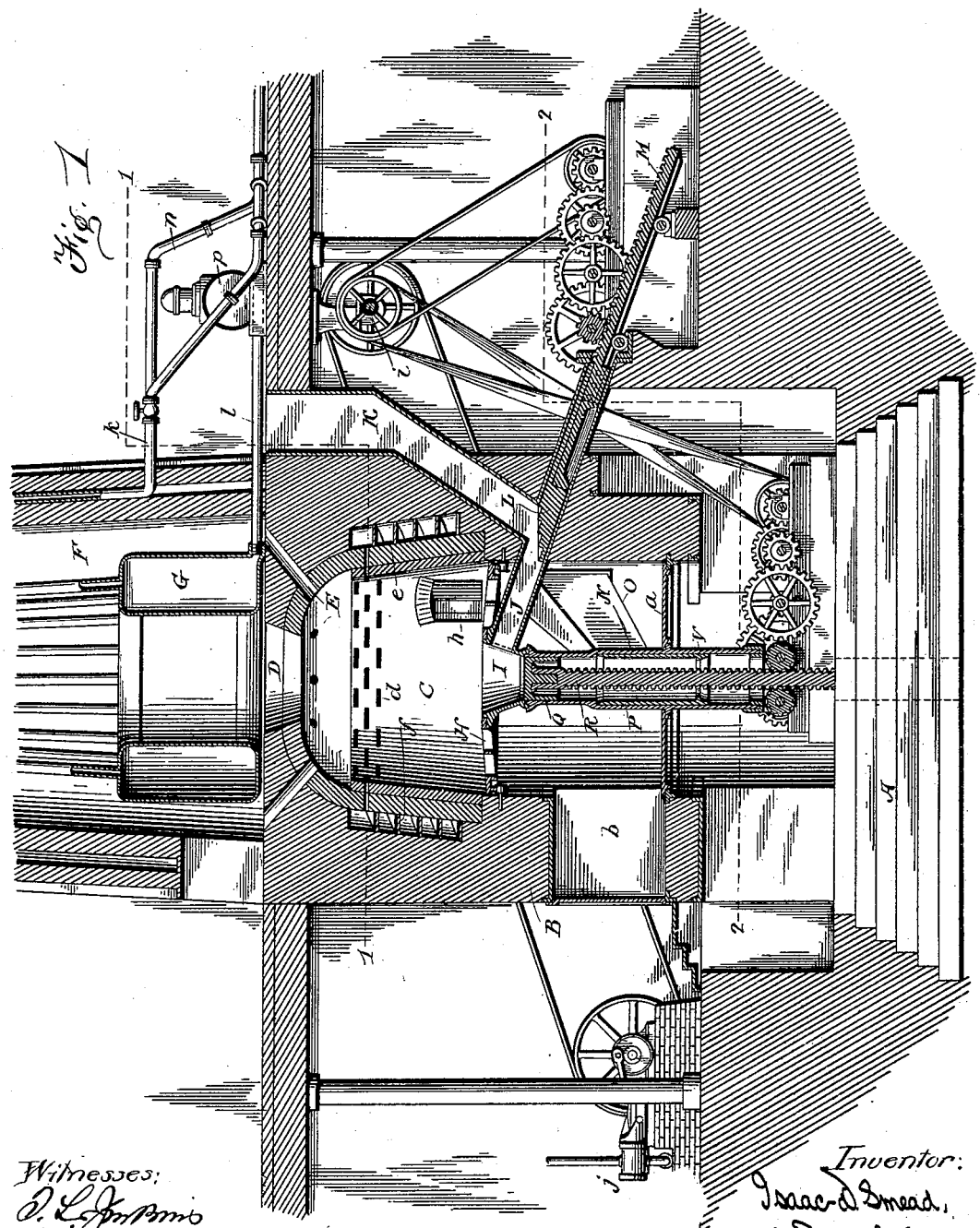
Figure 2:
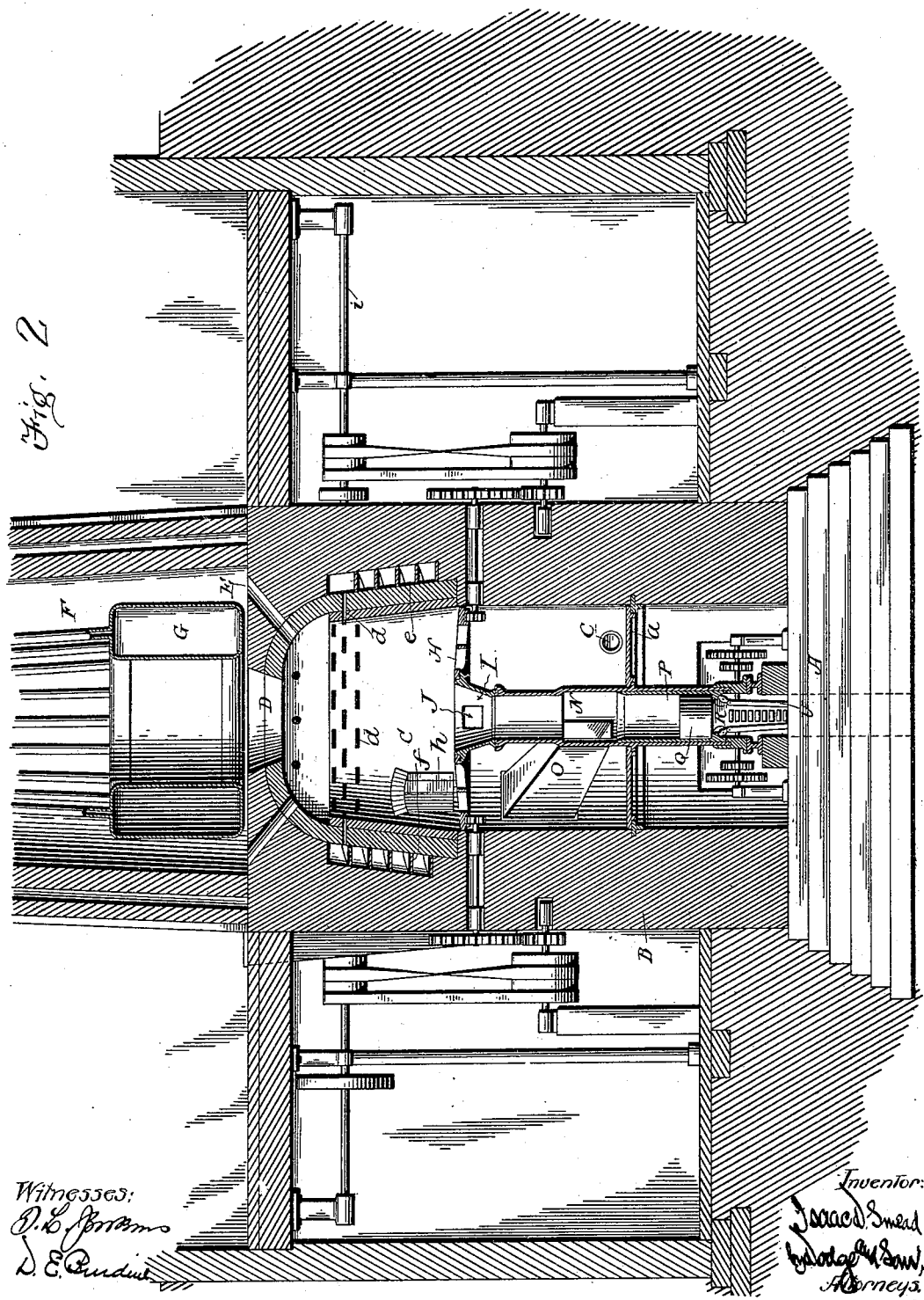
Figure 3:
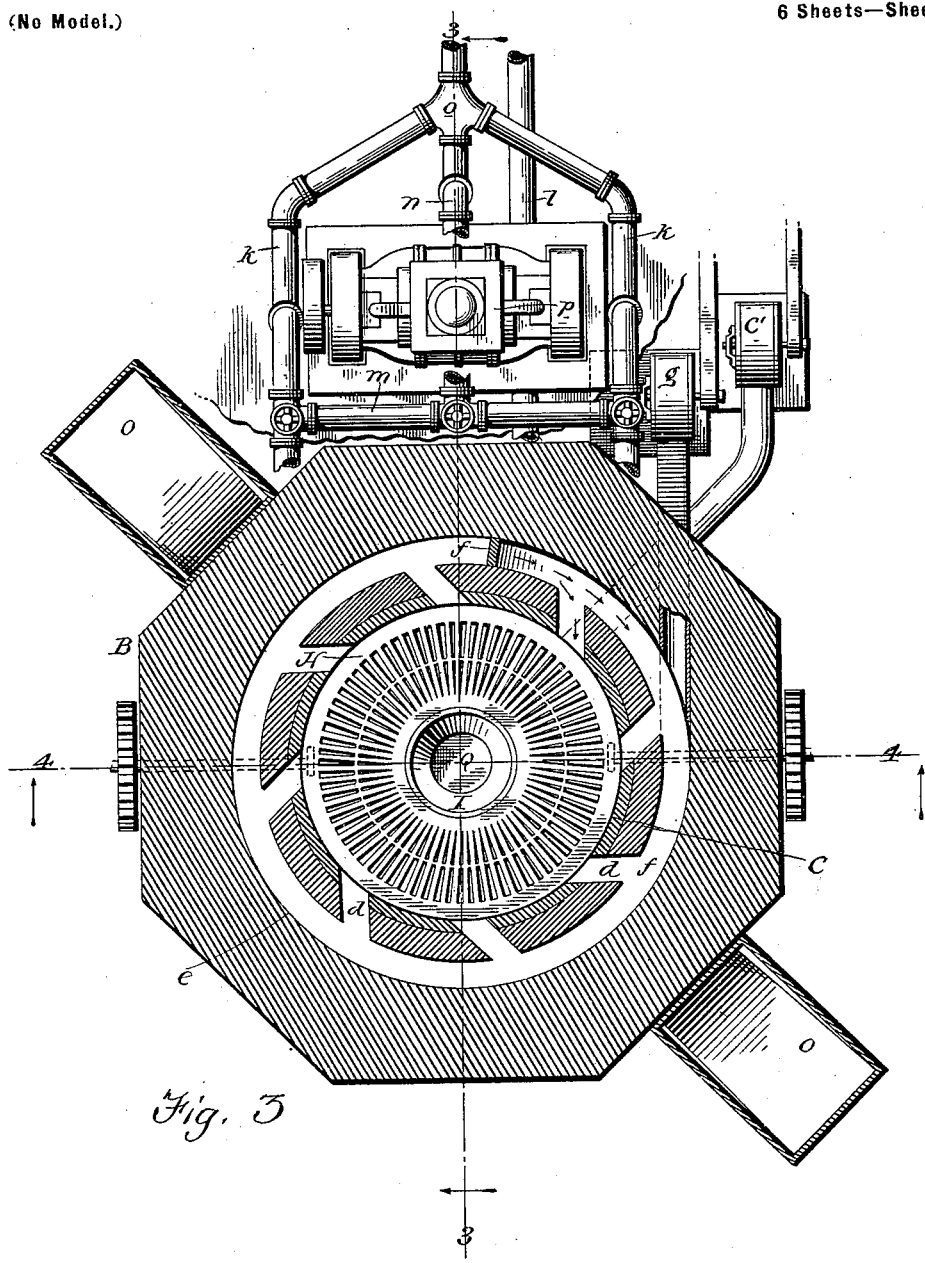
Figure 4:
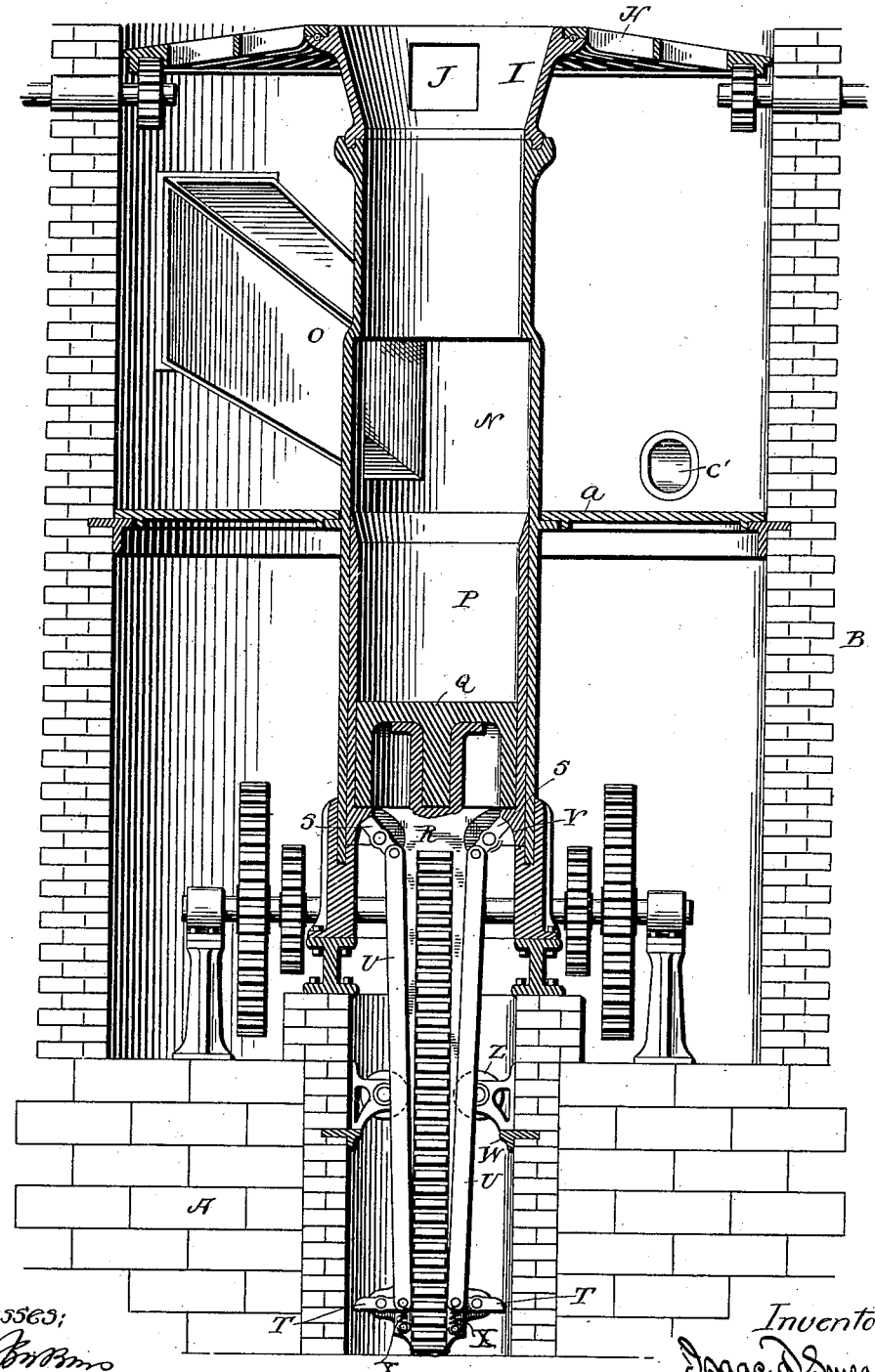

In the annexed drawings, forming part of this application, Figure 1 is a vertical sectional view of a portion of the apparatus on the line 3 3 of Fig. 3; Fig. 2, a similar view taken at right angles to Fig. 1 on the line 4 4 of Fig. 3; Fig. 3, a transverse horizontal section taken on the line 1 1 of Fig. 1; Fig. 4, an enlarged vertical sectional view of a portion of the apparatus; Figs. 5, 6, and 7, similar views showing the same parts in different relations, and Fig. 8 a transverse sectional view taken on the line 2 2 of Fig. 1.

The object of my invention is, primarily, to provide a furnace wherein refuse and like material may be burned to advantage, and, secondly, to construct a plant in connection with such furnace wherein the water heated in the boiler above the furnace is caused to traverse a system of pipes and be returned to the boiler to be again heated.

Referring to the drawings, A indicates a foundation upon which is supported a well or chamber B, in the upper portion of which is formed a combustion-chamber C, having a central discharge-opening D and a series of smaller openings E to one side thereof, all of which communicate with the base of a stack or chimney F, in which is mounted the boiler or water-heater G. The fuel or combustion chamber C is divided off from the main or lower portion of the well or chamber B by a revoluble grate H, and, as will be seen upon reference to Fig. 2, suitable gearing is provided for imparting rotary motion to the grate. Said grate is formed with a central opening, beneath which is mounted a hopper I, having a lateral opening communicating with a chute or channel J, which in turn is connected with an upwardly-extending chute or channel K. The channel J extends out through the wall of the well, and in said extension is mounted a sliding head or ram L, the forward end of which is stepped, as shown in Fig. 1. To the rear end of said ram there is connected a rack M, and a pinion connected through suitable gearing meshes with said rack and operates to move the ram up or down in said chute or channel J. When said ram is in its elevated or uppermost position, the lower or delivery end of the chute or channel K is of course closed. This part of the apparatus is designed to feed coal or other fuel to the grate.

Beneath the hopper I and forming a downward continuation thereof is a trunk or cylindrical chamber N, the lower portion of which is somewhat larger than the portion lying immediately below the hopper I. Laterally-extending trunks O open into the upper enlarged portion of the chamber N, as will be seen upon reference more particularly to Figs. 2 and 4. These trunks are designed more especially for the reception of garbage, refuse, and like material to be used as fuel and burned.

Mounted within chamber N and making a close fit with the walls thereof is a collar or sleeve P, the upper end of which is sharpened or beveled, forming a cutting edge. A head or ram Q is in turn mounted within the collar, and extending downwardly therefrom is a bar R, having racks formed upon two opposite faces thereof, as best illustrated in Fig. 1. Said head or ram forms a close fit with the interior face of the sleeve or collar P and is designed after the collar has been elevated to the position indicated in Fig. 5 to be moved up in said collar and to discharge therefrom the material which has entered into the collar above the head through the trunk O. Suitable gearing (best shown in Figs. 1 and 8) is employed for raising and lowering the rack. Upon reference more particularly to Fig. 8 it will be noted that the bar R is acted upon on opposite sides, so as to relieve it of all lateral strains and permit its free upward movement.

Mechanism must be provided to have the sleeve or collar P move up with the head or ram until said sleeve or collar has reached its highest position and closed the mouths of the trunks O, and to this end are pivoted at or near the upper end of the bar R levers S, while at the lower end are two similar levers T, the upper and lower levers on each side being connected by a bar or link U. Normally the levers S bear upon the inwardly-projecting shoulder V, formed on the lower end of the sleeve or collar, and as the rod R, with its head, is moved upwardly the collar is carried with it. When the parts reach the position indicated in Fig. 5, the lower levers T come in contact with projections W, extending outwardly from the wall of the well or chamber in which the rod R works, and tend to trip said levers, forcing the upper pair of levers S out from beneath the inwardly-projecting member V, thereby permitting the head or ram to move up independently of the sleeve or collar to the position indicated in Fig. 7, wherein it will be seen that the head or ram is in such position that any material which was in the trunk N will be discharged therefrom up through the hopper I. The friction between the parts and the pressure of the material in the trunks O bearing against the side of the sleeve or collar will tend to hold it against retrograde movement until the head or ram Q descends and comes in contact with the inwardly-projecting shoulder V. To normally hold the levers in their proper position, or that illustrated in Fig. 4, springs X are secured to the links U and draw down the inner ends of levers S. Guide-rollers Z are secured to the walls and bear upon the opposite faces of the rod or bar R and serve to steady and guide the same.

Plates $a$ are mounted within the well or chamber B and serve to receive the ashes which pass down from the grate from time to time. An opening or passage $b$ is provided in the wall of the chamber for access to the ash-receiving plates. A somewhat smaller opening $c$ is formed in the wall of the chamber beneath the grate for the purpose of admitting air to aid in the combustion of the material and is in direct communication with a fan or blower $c'$.

The fire-chamber C is formed as illustrated in Figs. 1, 2, and 3. It will be seen that it is provided with a lining in which is a series of openings $d$, which communicate with a space or chamber $e$, said space or chamber extending from a point near the grate upwardly to and in line with the openings $d$. A partition or partitions $f$ are formed in said chamber $e$ and extend around spirally therein, so that the air which enters at the lowermost part thereof from a fan or blower $g$ must traverse through the various flights formed in the chamber and in so doing absorb some of the heat from the surrounding walls, so that when it passes out of the openings or exits $d$ it is heated to a sufficiently high degree as not to chill the fire, but, on the contrary, will aid proper combustion. As will be noted upon reference to Fig. 3, the openings $d$, which extend out from the chamber $e$, are tangential to the fire-chamber, so that the hot air forced out from said openings has what may be termed a "vortical" or "whirling" movement, which in practice is found to be highly advantageous in burning garbage and like material. It is found that the material will burn to better advantage and more rapidly when this construction is employed than is the case where the air is not fed in this manner. An opening $h$ is provided in the wall of the fire-chamber to afford entrance to the interior of the furnace.

Figure 8:
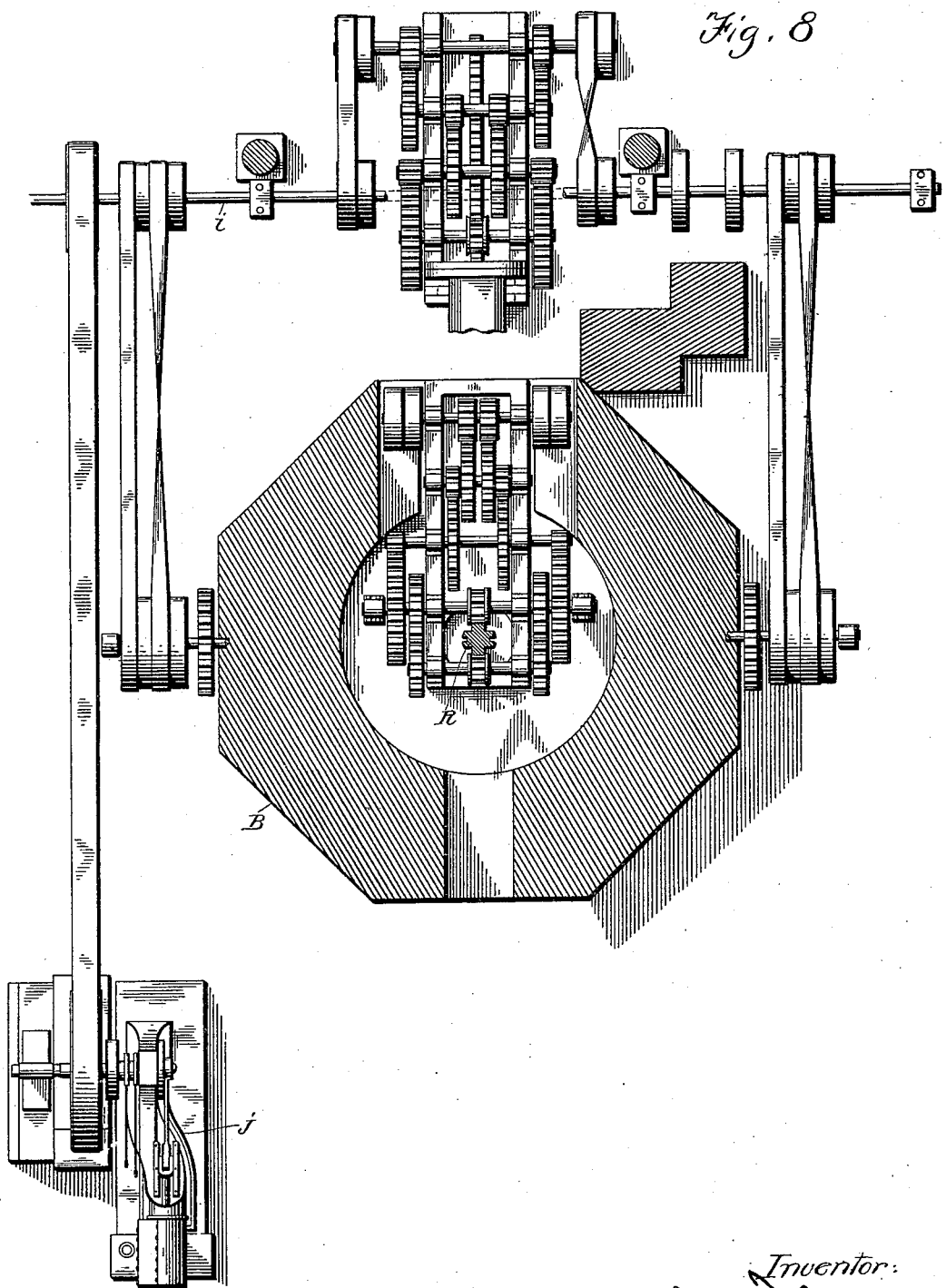

The various sets of gearing are driven from a common shaft $i$, Fig. 1, so that all the parts may be timed in their movements, said shaft deriving its motion from an engine $j$, Fig. 8.

The boiler G has outlet-pipes $k$, Figs. 1 and 3, extending from the uppermost section of the boiler, as is well understood, and a return-pipe $l$, connected with the lowermost section. The outlet-pipes are connected by a cross-pipe $m$, and said pipe $m$ is in turn connected through a branch $n$ with a coupling $o$, with which the pipes $k$ themselves are connected. Suitable valves are placed in the mains for controlling the flow of the water therethrough, and the pipe $n$ is connected to a rotary pump $p$ for the purpose of forcing water through the mains should occasion so require. The boiler is preferably made up of a series of sections or drums connected by pipes, as set forth in my application, Serial No. 727,560, filed on the 17th day of August, 1899.

In feeding the fuel to the combustion-chamber above the grate it will be found preferable to force a charge of coal in above the garbage charge which is resting in the chamber when the plunger is in its lowermost position. If this is done when the plunger is elevated, the coal will be thrown toward the sides of the combustion-chamber, leaving the charge of garbage in the center surrounded by a mass of coal, which of course soon becomes incandescent.

Having thus described my invention, what I claim is—

1. The combination of a combustion-chamber, a grate mounted therein; a chamber located beneath said grate; a trunk leading into said chamber; means for forcing out a charge of material from said chamber; and independent means for closing the opening of the trunk leading thereto.

2. In combination with a combustion-chamber, a grate mounted therein; a chamber located beneath said grate and opening into said chamber; means mounted within said chamber adapted and arranged to discharge a charge of material therefrom; independent means to close the mouth of the trunk; a second trunk leading into the chamber; and means for forcing a charge of material from said trunk into the chamber.

3. In combination with a combustion-chamber; a grate mounted therein; a chamber located beneath said grate and opening into the combustion-chamber; a trunk leading into said chamber; a plunger working in said chamber and adapted and arranged to discharge a charge of material from said chamber; and means working in conjunction with said plunger adapted to close the mouth of the trunk as the plunger moves upwardly to discharge the load.

4. In combination with a combustion-chamber, a grate mounted therein; a chamber located beneath said grate and opening into the combustion-chamber; a trunk opening into said chamber; a plunger mounted and working within said chamber; a sleeve or collar also mounted within said chamber; and means for elevating the collar and closing the opening of the trunk as the plunger is elevated to discharge the charge from the chamber.

5. In combination with a combustion-chamber, a grate mounted therein; a chamber mounted below said grate and opening into the combustion-chamber; a trunk opening into said chamber; a sleeve working in said chamber; a plunger working within said sleeve; means for elevating said plunger; and means carried by said plunger for carrying the sleeve upwardly to close the mouth of the trunk as said plunger discharges the charge of material from the chamber.

6. In combination with a combustion-chamber, a grate mounted therein; a chamber located beneath said grate and opening into the combustion-chamber; a trunk opening into said chamber; a sleeve working in said chamber; a plunger mounted within said sleeve; means for elevating said plunger; locking devices carried by said plunger adapted and arranged to act upon the sleeve; and means for tripping said locking devices when the sleeve has reached a position to close the mouth of the trunk.

7. In combination with a combustion-chamber; a grate mounted therein; a hopper I extending downwardly from said grate; a chamber N connected to said hopper; a trunk O opening into said chamber; a sleeve P mounted within said chamber; a plunger working within said sleeve; an arm extending downwardly from said plunger; means for raising and lowering said arm and the plunger; levers pivoted to said arm and arranged to bear upon the under face of the sleeve; and means for withdrawing said levers from beneath said sleeve when the sleeve has reached such position as to close the mouth of the trunk O.

8. In combination with a combustion-chamber; a grate mounted therein; a chamber located below said grate communicating with the combustion-chamber; a trunk O opening into said chamber; a sleeve P mounted within said chamber; a plunger mounted within said sleeve; a bar R extending downwardly from said plunger; means for raising and lowering said bar; levers S pivoted to the bar and adapted to engage the lower edge of the sleeve; levers T pivotally mounted upon the lower end of the bar; links U connecting said levers; and means for acting upon the levers T when the sleeve has been elevated to such position as to close the mouth of the trunk.

In testimony whereof I have signed my name to this specification in the presence of two subscribing witnesses.

ISAAC D. SMEAD.

Witnesses:
J. D. POST,
BURTON A. SMEAD.